US007992699B2

(12) United States Patent
Adams et al.

(10) Patent No.: US 7,992,699 B2
(45) **Date of Patent: *Aug. 9, 2011**

(54) MACHINE AND METHOD FOR CASH RECYCLING AND CASH SETTLEMENT

(75) Inventors: Thomas P. Adams, Oconomowoc, WI (US); Robert E. Gunst, Neosho, WI (US); Robert L. Zwieg, Watertown, WI (US); Robert F. Fredrick, Watertown, WI (US); Joseph P. Hanus, Watertown, WI (US); Jon R. Stieber, Oconomowoc, WI (US)

(73) Assignee: Talaris Inc., Watertown, WI (US)

(*) Notice: Subject to any disclaimer, the term of this patent is extended or adjusted under 35 U.S.C. 154(b) by 1078 days.

This patent is subject to a terminal disclaimer.

(21) Appl. No.: 10/821,004

(22) Filed: Apr. 8, 2004

(65) Prior Publication Data

US 2004/0231956 A1 Nov. 25, 2004

Related U.S. Application Data

(63) Continuation-in-part of application No. 10/411,561, filed on Apr. 10, 2003, now Pat. No. 6,983,836.

(51) Int. Cl.

| | |
|---|---|
| ***G07F 9/08*** | (2006.01) |
| ***G06F 7/00*** | (2006.01) |
| ***G06F 9/00*** | (2006.01) |
| ***G06F 19/00*** | (2006.01) |

(52) U.S. Cl. ........ 194/217; 194/215; 194/344; 194/350; 453/6; 453/10; 453/12; 453/16; 453/49; 453/57

(58) Field of Classification Search .................. 221/192; 222/390; 414/304; 193/23, DIG. 1; 194/215–217, 194/344, 346, 350, 353; 453/1–3, 6, 10, 453/12, 13, 16, 17, 19–21, 29, 30, 32–35, 453/39, 49, 57, 58, 61–63
See application file for complete search history.

(56) References Cited

U.S. PATENT DOCUMENTS 3,682,183 A 8/1972 Morrow et al.

(Continued)

FOREIGN PATENT DOCUMENTS

EP 1 031 950 A1 8/2000

(Continued)

*Primary Examiner* — Jeffrey A Shapiro
(74) *Attorney, Agent, or Firm* — Boyle Fredrickson, S.C.

(57) ABSTRACT

A cash recycling machine (10) has an input hopper (19) for feeding batches of mixed coinage to a coin sorter (21) for sorting, counting and directing coins into a plurality of bulk coin storage receptacles (31, 32, 33, 34). From there, the coins are fed into a plurality of smaller dispensing hoppers (46, 47, 48, 49) equipped with sensors (88) for counting the coinage as it is dispensed. A controller (80) is responsive to inputs from a user in a first operating cycle of the machine to cause the dispensing hoppers (46, 47, 48, 49) to dispense an amount of sorted coinage into one of several receptacles including a cash drawer (15) or coin bags (40). A controller (80) is responsive to inputs from a user in a second operating cycle of the machine to receive, sort and count a batch of coins that is loaded into the input hopper (19) and stored in the bulk coin storage receptacles (31, 32, 33, 34). The controller (80) has the ability to track input and output transactions of employees through the work shift for reconciliation at the end of the work shift and to report results to a central accounting computer. In addition, the machine (10) can operate in the first and second cycles simultaneously.

18 Claims, 15 Drawing Sheets

U.S. PATENT DOCUMENTS

| | | | | | |
|---|---|---|---|---|---|
| 4,125,195 | A * | 11/1978 | Sasadi | 414/373 |
| 4,383,540 | A | 5/1983 | De Meyer et al. | |
| 5,021,026 | A | 6/1991 | Goi | |
| 5,056,643 | A | 10/1991 | Kirberg | |
| 5,067,928 | A * | 11/1991 | Harris | 453/17 |
| 5,230,653 | A | 7/1993 | Shinozaki et al. | |
| 5,400,891 | A | 3/1995 | Winstanley | |
| 5,501,633 | A | 3/1996 | Watkins et al. | |
| 5,830,054 | A * | 11/1998 | Petri | 453/5 |
| 5,954,576 | A | 9/1999 | Coulter et al. | |
| 5,997,395 | A * | 12/1999 | Geib et al. | 453/10 |
| 6,076,649 | A | 6/2000 | Waldorff, Jr. | |
| 6,109,416 | A * | 8/2000 | Nickerson | 194/206 |
| 6,165,064 | A | 12/2000 | Aurelius et al. | |
| 6,264,545 | B1 | 7/2001 | Magee et al. | |
| 6,267,662 | B1 | 7/2001 | Jard et al. | |
| 6,318,537 | B1 * | 11/2001 | Jones et al. | 194/346 |
| RE37,662 | E | 4/2002 | Uchida et al. | |
| 6,540,601 | B2 | 4/2003 | Nottingham et al. | |
| 6,623,349 | B2 | 9/2003 | Fletcher | |
| 6,637,576 | B1 | 10/2003 | Jones et al. | |
| 6,896,177 | B2 | 5/2005 | Carter | |
| 6,983,836 | B2 * | 1/2006 | Adams et al. | 194/302 |
| 7,073,707 | B2 | 7/2006 | Carter | |
| 7,163,454 | B2 | 1/2007 | Carter | |
| 2001/0034203 | A1 | 10/2001 | Geib | |
| 2002/0063035 | A1 | 5/2002 | Blad et al. | |
| 2002/0152141 | A1 * | 10/2002 | Carter | 705/29 |
| 2004/0004116 | A1 | 1/2004 | Hatanaka | |
| 2006/0106716 | A1 * | 5/2006 | Hurwitz et al. | 705/40 |

FOREIGN PATENT DOCUMENTS

| | | | |
|---|---|---|---|
| JP | 2001043424 | A | 2/2001 |
| WO | 99 48058 | A | 9/1999 |
| WO | WO 99/48058 | | 9/1999 |

* cited by examiner

MACHINE AND METHOD FOR CASH RECYCLING AND CASH SETTLEMENT

CROSS REFERENCE TO RELATED APPLICATION

This is a continuation-in-part of U.S. patent application Ser. No. 10/411,561, filed Apr. 10, 2003, now U.S. Pat. No. 6,983,836.

TECHNICAL FIELD

The present invention relates to cash handling systems, and more particularly to cash handling equipment for tracking and reconciling cash for multiple cashiers or for multiple cash handling employees over a work shift.

DESCRIPTION OF THE BACKGROUND ART

Cash settlement for retail establishments is often handled in a back room or other service area, where cashiers or other employees load and empty cash register drawers and count and record amounts of cash taken and returned. The comparison of the cash taken with the cash returned is often referred to in banking as "cash settlement." This can also be referred to as balancing or reconciliation. Cash settlement in back rooms of retail establishments has often required separate calculations and record-keeping. While some cash settlement systems have been provided for banks in which personal computers have been connected to cash handling machines, there has not been a convenient and compact machine available for retail establishments.

Geib et al., U.S. Pat. Appl. No. 2001/0034203 published Oct. 25, 2001, shows a small coin sorter for filling a coin tray with coins counted by the machine. This allows a cashier to empty a till (also referred to herein as a cash drawer) into the sorter and have the amount counted. It is also possible to empty a batch of coins into the machine for counting as they are deposited in the till.

Machines of the type just described have had limited capacity for storing coins of various denominations. To serve a number of employees a bulk coin recycling machine must have an initial amount of coins to dispense to till drawers and must be able to handle large amounts of coinage received back from multiple till drawers at the same time it is also conducting dispensing operations. In machines known to date, the capacity of the hoppers has been small and no overflow mechanism has been provided.

Various types of machines for both receiving and dispensing coins have been known including ATM machines and large cash handling machines for gaming operations. ATM machines have generally been limited to dispensing change, cash withdrawals in the form of bills, or pre-rolled rolls of coin. The large cash handling machines for gaming establishments sort the change into bins, which must then be emptied. Change dispensers and small point-of-sale (POS) recyclers have also been known for dispensing change in multiple denominations to a retail customer via a single device such as a change cup, for example, where the denominations are mixed together.

There remains a need for a bulk coin recycling machine to track coin receiving and dispensing operations for multiple employees over a work shift and to reconcile the amounts received with the amounts originally dispensed—by employee—and record the difference. The machine should have the ability to sort coins by denomination, store coins by denomination and dispense multiple denominations, while keeping the denominations separate from each other. This is so that the cashiers will receive batches of coins in a sorted condition. The device should have networking capability with other automated cash handling equipment, such as note handling equipment and central accounting computers for reporting accounting totals. Such networking capability could utilize wires or be wireless.

SUMMARY OF THE INVENTION

The invention provides a cash recycling machine for receiving and dispensing batches of coins such as a cashier's operating batch or a till's worth of coins.

The machine has the ability to track transactions for multiple employees through the work shift and reconcile accounts for multiple employees at the end of the work shift ("perform cash settlement"). The machine is intended for use by employees rather than retail customers.

In contrast to point-of-sale coin recyclers and change dispensers, the bulk cash recycling machine of the present invention dispenses to employees rather than to retail customers. The machine sorts coins by denomination, stores coins by denomination and dispenses multiple denominations, with input and output operations being performed simultaneously when demanded. In addition, the machine has overflow capability if the input operations provide more coinage than is being dispensed. The cashiers or employees receive batches of coins in a sorted condition. In addition, the machine may have a specialized port for receiving a cash drawer or till for receiving multiple denominations simultaneously.

Unlike self-service coin totalizing machines, the machine of the present invention does not require its users to input coins, since it has an initial store of coins to dispense. The machine may be located away from sales areas and check-out areas of a retail establishment. There is no requirement that the machine be networked with point-of-sale computer terminals functioning as cash registers.

The cash recycling and settlement machine of the present invention can include a card reader or a touch screen to receive employee ID information, which grants access to the machine and allows tracking of employee accounts during the work shift. The machine can handle cash and accounting for many employees. The cash recycling and settlement machine of the present invention may perform a cash receiving operation and a cash dispensing operation simultaneously.

The machine can provide monitoring, accounting and cash settlement functions. The cash handling machine can be connected to other machines and computers via network communications which can utilize wires or be wireless.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
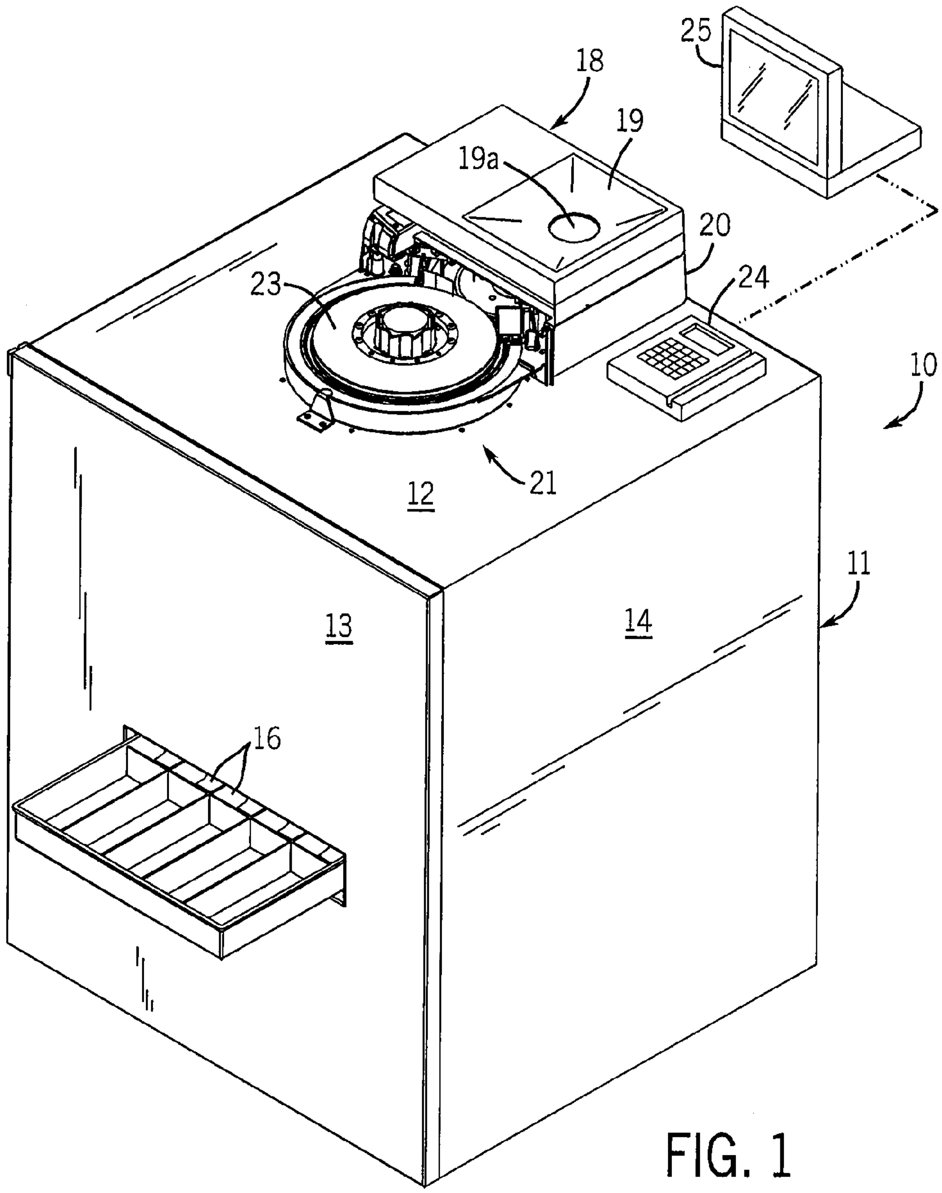
FIG. 1 is a perspective view of a first embodiment of a coin recycling machine according to the present invention, with part of a subassembly housing removed for a view of internal mechanism.

FIG. 1 shows a cash recycling machine 10 in accordance with the present invention. This machine performs at least the functions of the coin recycling machine described in the parent application, U.S. patent application Ser. No. 10/411,561 filed Apr. 10, 2003, the disclosure of which is hereby incorporated by reference. The machine 10 described herein can also be networked as described U.S. patent application Ser. No. 10/411,561.

Figure 2:
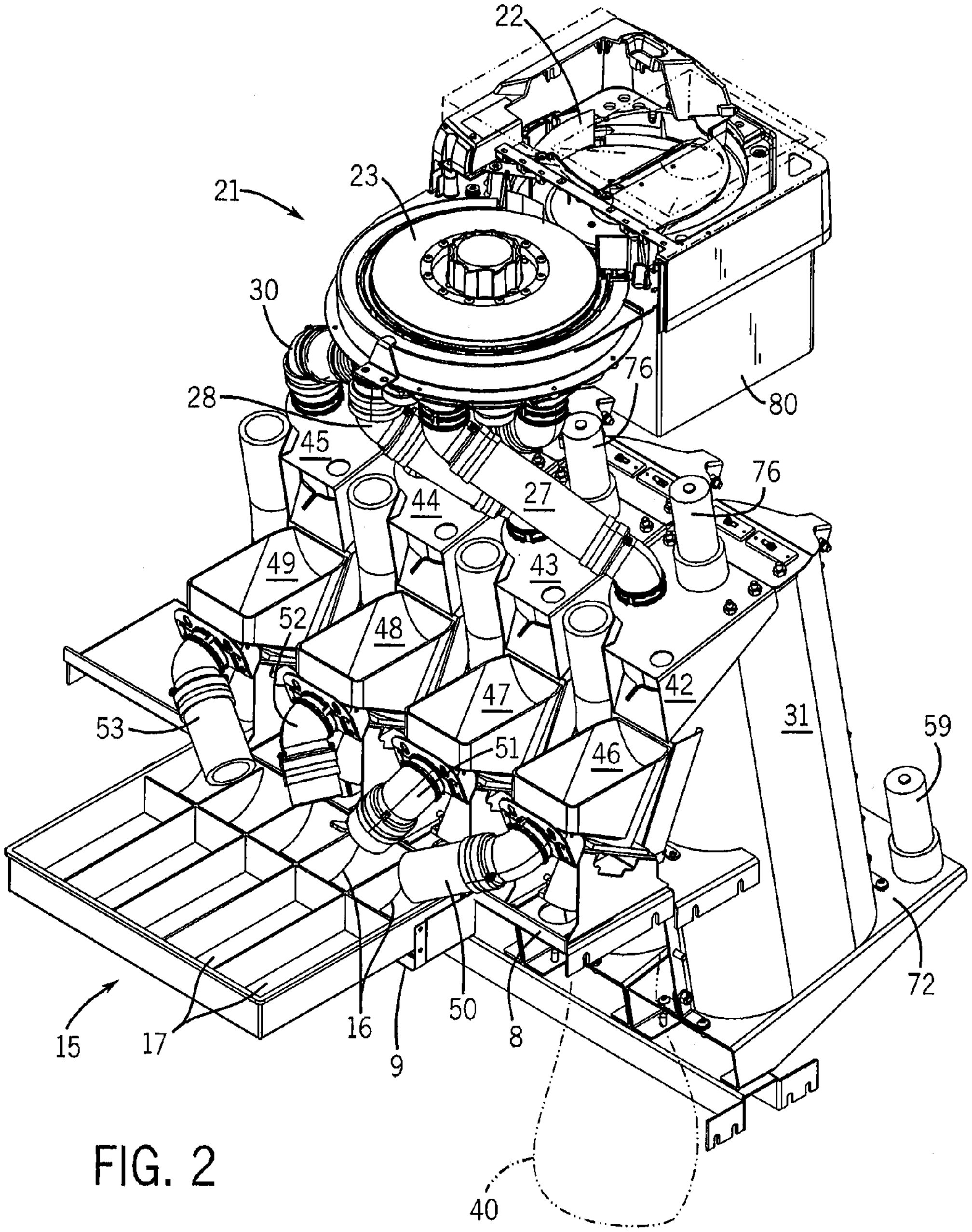
FIG. 2 is a perspective of an internal mechanism of a coin recycling machine according to the present invention, the enclosure being removed for a better view of the interior mechanism.

The machine 10 described herein adds the capability of storing larger amounts of coinage to supply the dispensing hoppers 46-49 seen in FIG. 2. The dispensing hoppers 46-49 are primarily for the purpose of counting amounts of coin of each denomination as the coins are dispensed. The capacity of these hoppers 46-49 is not large. In situations where large amounts of coinage are being received and dispensed, the invention provides bulk coin storage (BCS) receptacles 31-34 to receive and store coins input into the machine and to supply the dispensing hoppers 46-49 with coin as needed. The machine 10 also provides for bagging operations as seen in FIG. 2.

As seen in FIG. 1, the machine 10 is housed in an enclosure 11 having top, front, back and side walls 12-14. The front wall 13 has an opening for inserting a cash drawer 15 having compartments 16, 17 for holding coins and notes, respectively. Inside the machine as seen in FIG. 2, a supporting framework 8 provides a ledge 9 for supporting a front end of a cash drawer 15. The coin compartments 16 project into the inside of the machine 10 to receive coins. Referring to FIG. 1, an intake and sorting subassembly 18 is provided on top of the enclosure 11 and includes an intake hopper 19 mounted on a base 20 in which a coin sorter 21 is enclosed. The coin sorter 21 has a queuing disc 22 (FIG. 4) that is positioned below an opening 19*a* (FIG. 1) of the hopper 19 and a coin driving disc 23 (FIG. 1) which is disposed over a sorting plate (not seen in FIG. 1) of the sorter 21. A keypad/card reader input device 24 is mounted on top of the machine and an optional touch screen input device 25 can also be provided.

Figure 3:
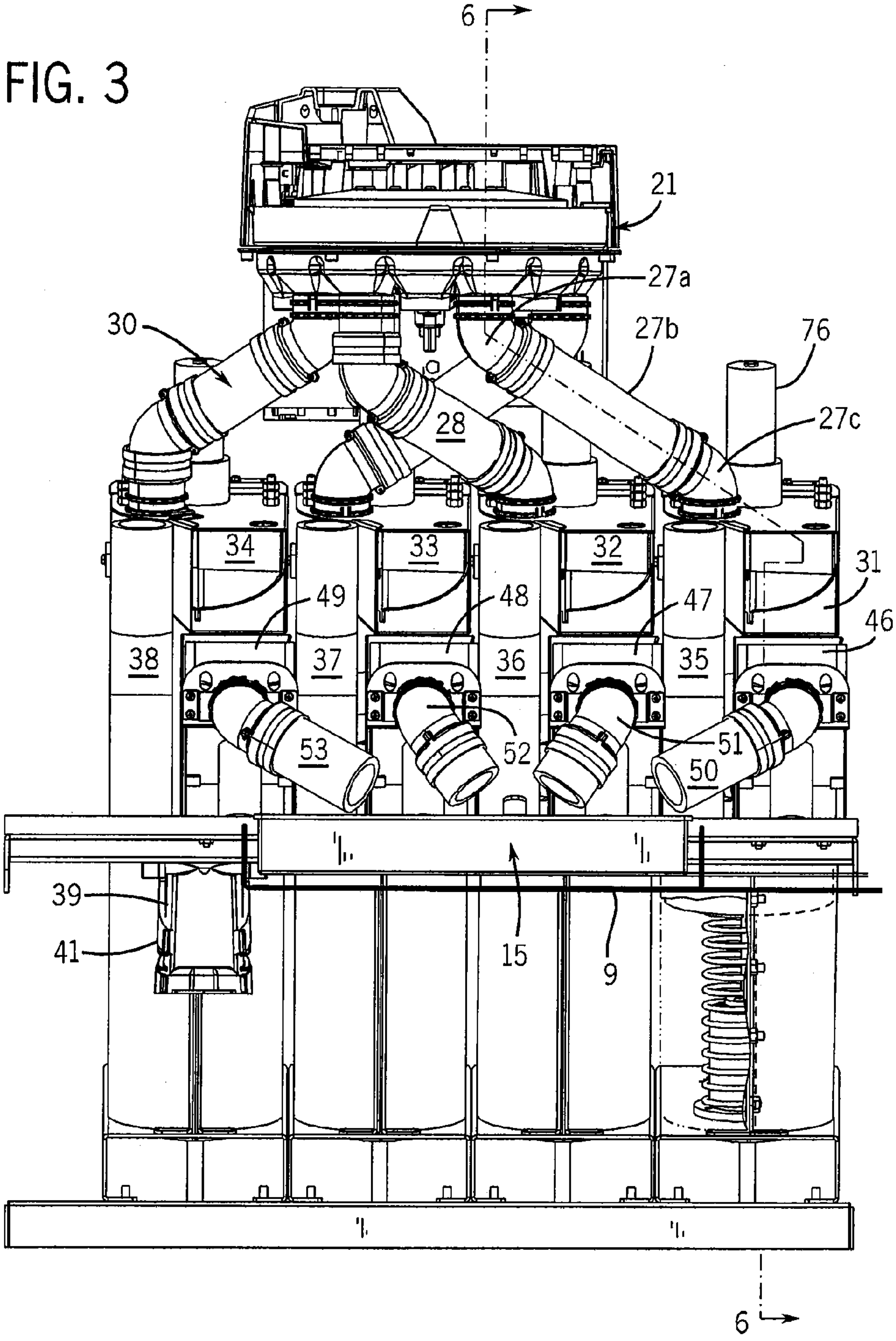
FIG. 3 is a front elevational view of the machine of FIG. 2.
Figure 4:
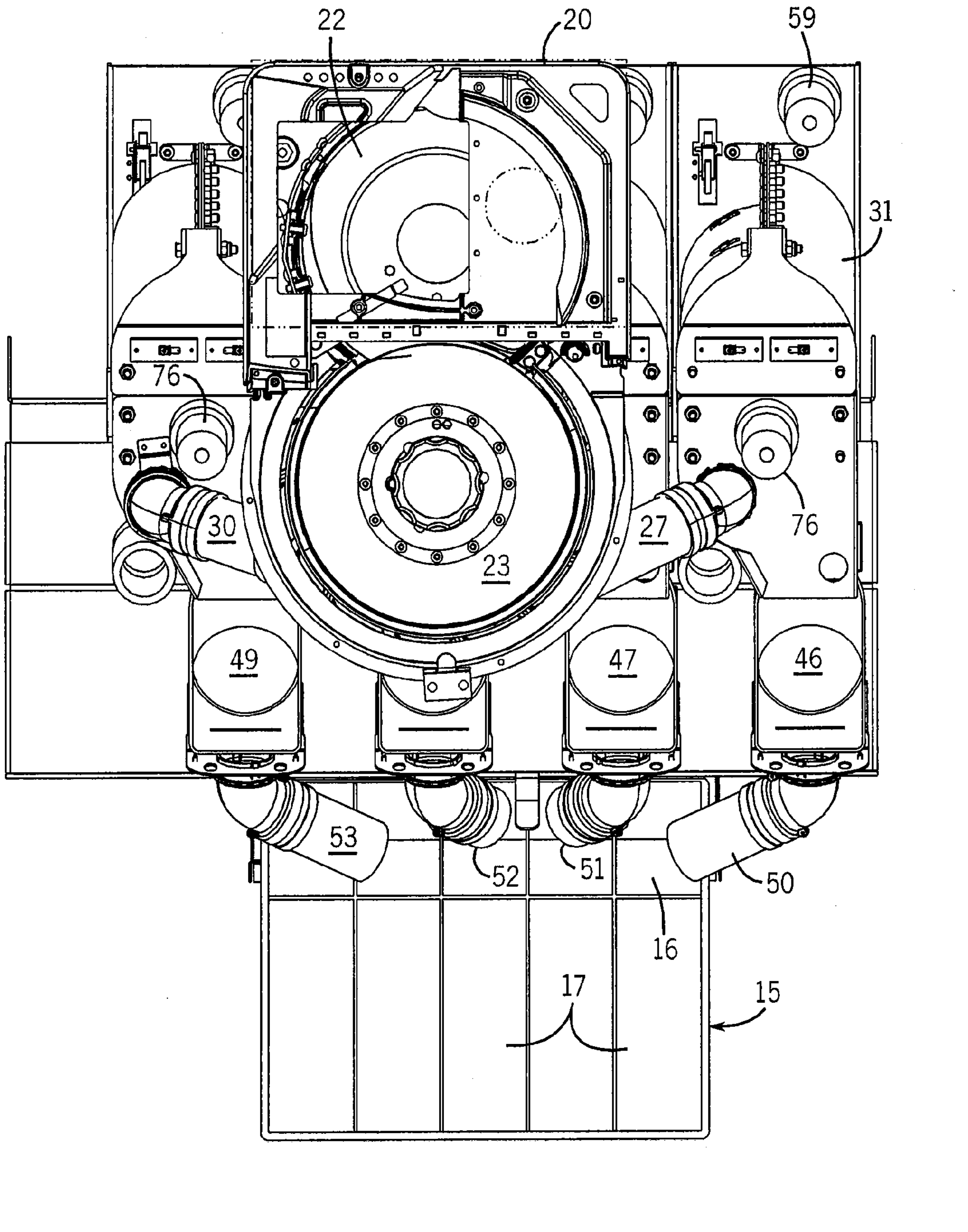
FIG. 4 is a top elevational view of the machine of FIG. 2.
Figure 5:
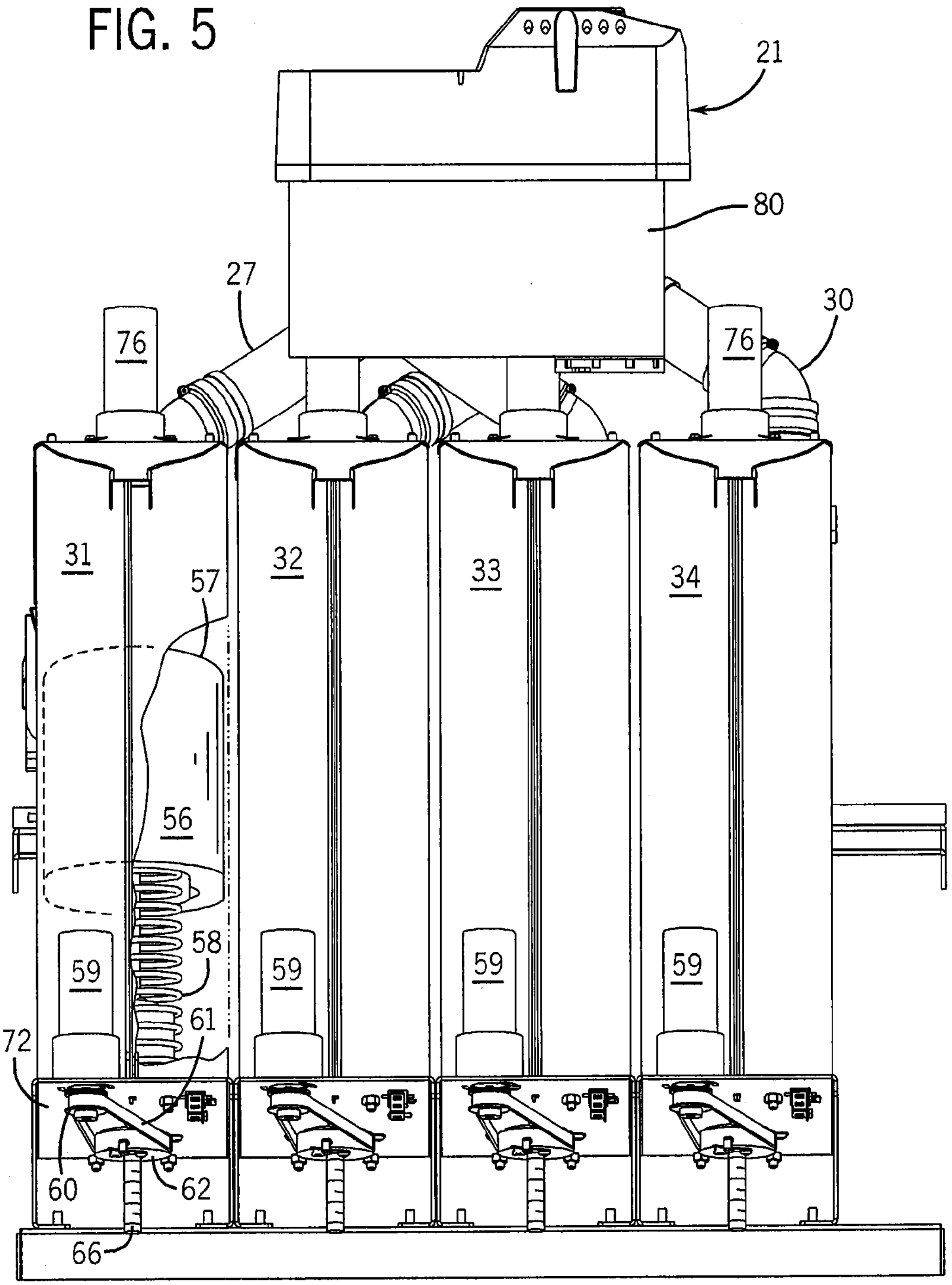
FIG. 5 is a rear elevational view of the machine of FIG. 2.

Referring to FIGS. 2, 3 and 4, the intake hopper portion 19 of the subassembly 18 has been removed and this shows a part of the queuing disc 22. When a batch of coins of mixed and unsorted denominations is dumped or loaded into the hopper 19 (FIG. 1), the coins fall onto the queueing disc 22, where they are arranged in single file and transferred to the driving disc 23 near an arm 26 (FIG. 4) that allows only one layer of coins to pass beneath it. The coins then are moved by driving disc 23 over a sorting plate, where the coins are sorted through sorting apertures of a type shown and described in Adams et al., U.S. Pat. Nos. 5,295,899 and 5,525,104. When the coins of respective denominations fall through the sorting apertures, they are conveyed in the present invention by feed tubes 27, 28, 29, 30 (FIG. 3) to mechanized bulk coin storage (BCS) receptacles 31, 32, 33, 34 to be described below. There is one feed tube and one BCS receptacle for each of the US denominations of pennies, nickels, dimes and quarters. Receptacle 31 contains pennies and receptacles 32, 33, 34 contain, nickels, dimes and quarters, respectively.

Although the number of BCS receptacles 31, 32, 33, 34 in the present embodiment is four, different numbers of BCS receptacles can be provided for additional denominations in the US coin set, such as halves or for doubling capacity for pennies for example. Different numbers of BCS receptacles could also be provided for the euro coin set, the Canadian coin set, or other coin sets used by other countries in the world.

As illustrated in FIG. 3, each of the feed tubes 27, 28, 29, 30, as exemplified by tube 27, has an upper elbow 27*a*, a straight line portion 27*b* and a lower elbow 27*c*. The tubes 27, 28, 29, 30 are fixed in position to feed into the BCS receptacles 31, 32, 33, 34. A diverter (not shown) can be actuated to divert coins to nearly vertical tubes 35, 36, 37, 38 that supply coins to coin bags 40 (one seen in phantom in FIG. 2), which would be attached to coin spouts 39 and held by bag clips 41 (one of these being shown in FIG. 3).

Figure 6:
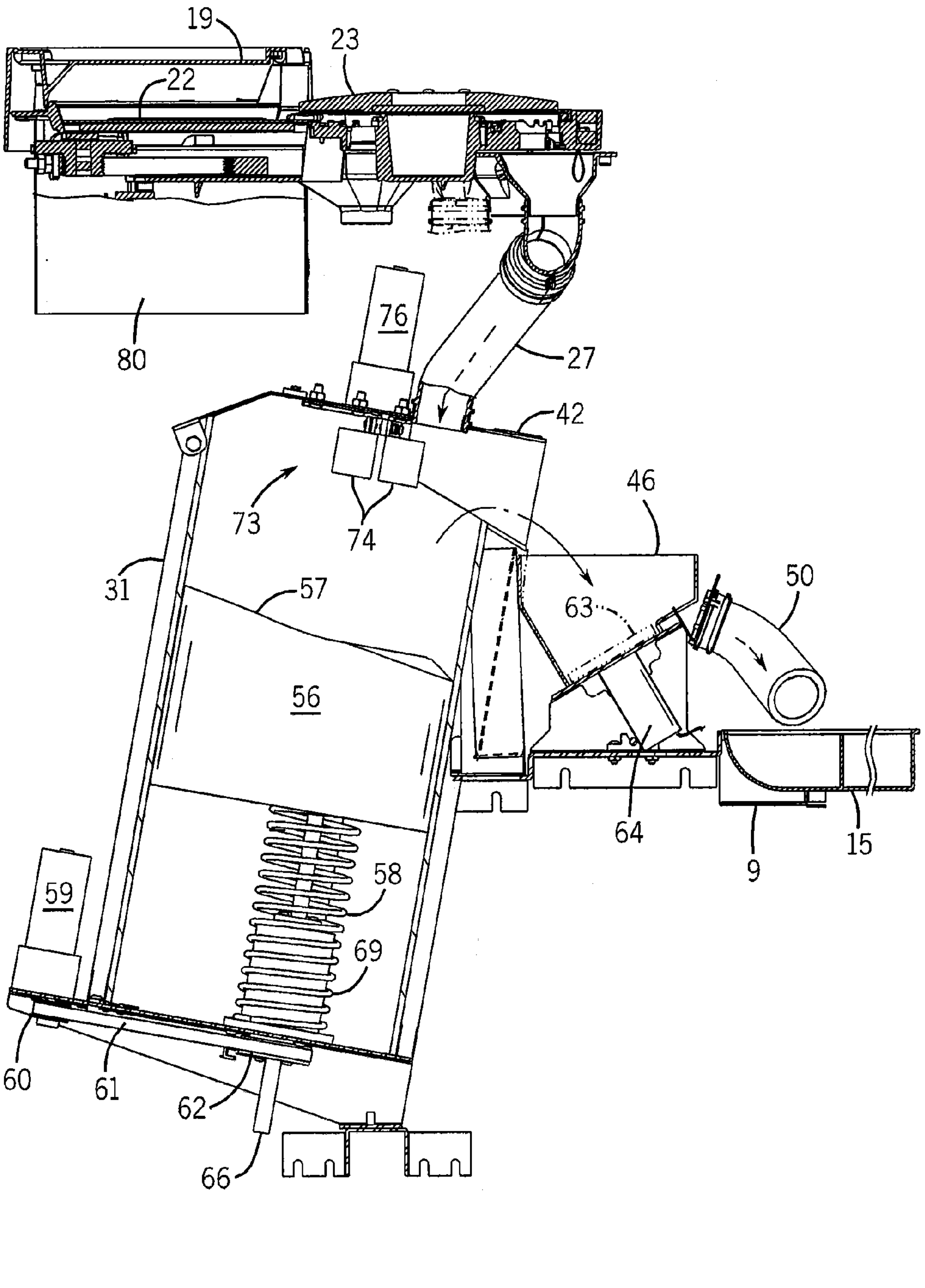
FIG. 6 is a left side sectional view in elevation taken in the plane indicated by line 6-6 in FIG. 3 showing a first position and movement of a piston.
Figure 7:
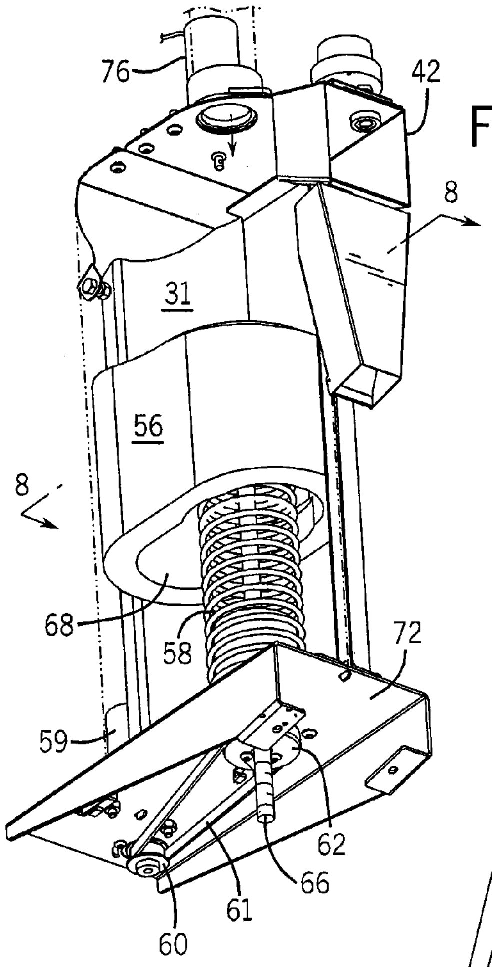
FIG. 7 is a bottom perspective detail of a coin feeding mechanism in one of the bulk coin receptacles seen in FIGS. 5 and 6.

As seen in FIG. 6, from the bulk coin storage receptacles 31, 32, 33, 34, coins are transferred through exit chutes 42-45 to dispensing hoppers 46, 47, 48, 49 (FIGS. 2, 4, 6). The dispensing hoppers 46, 47, 48, 49 have a smaller capacity for holding coins than the BCS receptacles 31-34. They are located immediately in front of their corresponding BCS receptacles 31-34 and receive coins through the exit chutes 42, 43, 44, 45 (FIG. 2). Coins are received in the dispensing hoppers 46-49 in a pile rather than being stacked in columns. The dispensing hoppers 46-49 (FIGS. 2, 4, 6) have coin ejection mechanisms 63 (FIG. 6) that are operated by motors 64 to eject coins through the tubular exit spouts 50, 51, 52, 53 (FIGS. 2, 3 and 4) to the cash drawer 15. The exit spouts 50-53 have elbows 54 and straight portions 55, and can be rotated to adjust the position of the exit over the cash drawer 15. The cash drawer 15 in this example has four note compartments 16 and four coin compartments 17. The coin dispensing hoppers 46-49 also have sensors 90 (shown schematically in FIG. 11) for detecting each coin as it is dispensed. In this way, a controller can be signaled with signals indicating the number of coins dispensed from each of the dispensing hoppers 46-49.

Referring to FIGS. 4-8, the BCS receptacles 31-34 are bins that are oval-shaped in cross section and formed by two half shells of metal or plastic that are welded together. The BCS receptacles 31-34 are sized to hold piles of loose coins which are not stacked in columns. Coins flow into the BCS receptacles 31-34 from the top, and are also dispensed at the top in a manner to be described below. The volume of each BCS receptacle 31-34 is approximately twenty times the volume of a coin dispensing hopper 46-49. Each BCS receptacle 31-34 is many times wider than an individual coin stored therein.

Figure 9:
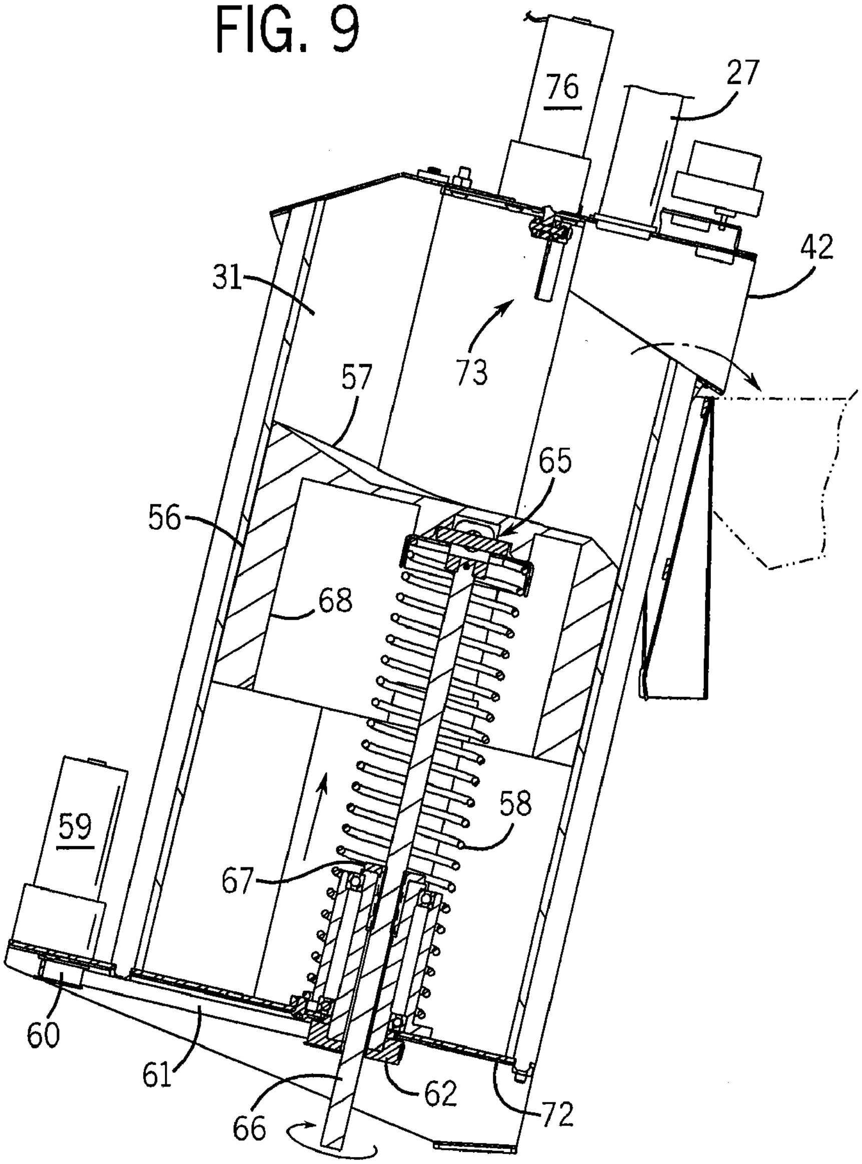
FIG. 9 is another view of the parts seen in FIG. 8 in a second position.
Figure 10:
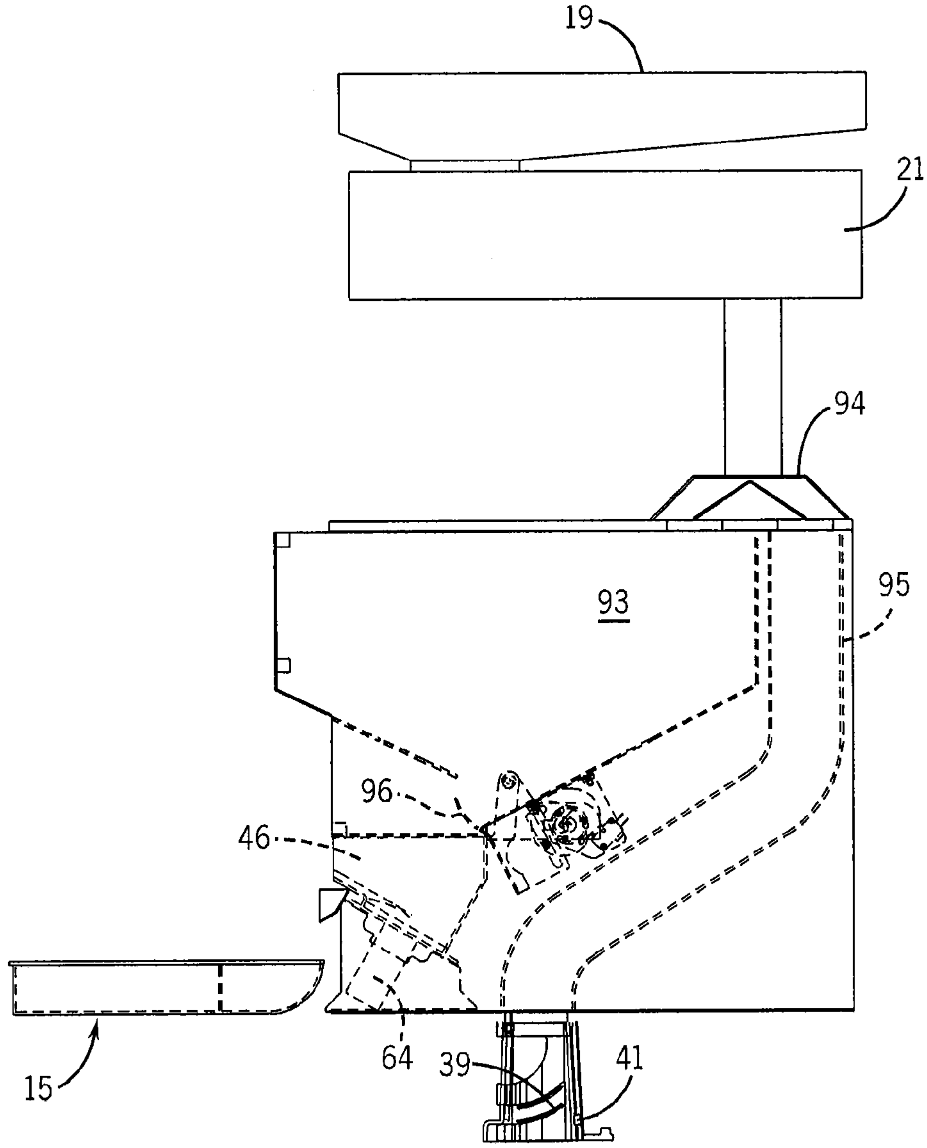
FIG. 10 is a schematic right side view of a second type of the bulk storage receptacles which can be used in the present invention.
Figure 11:
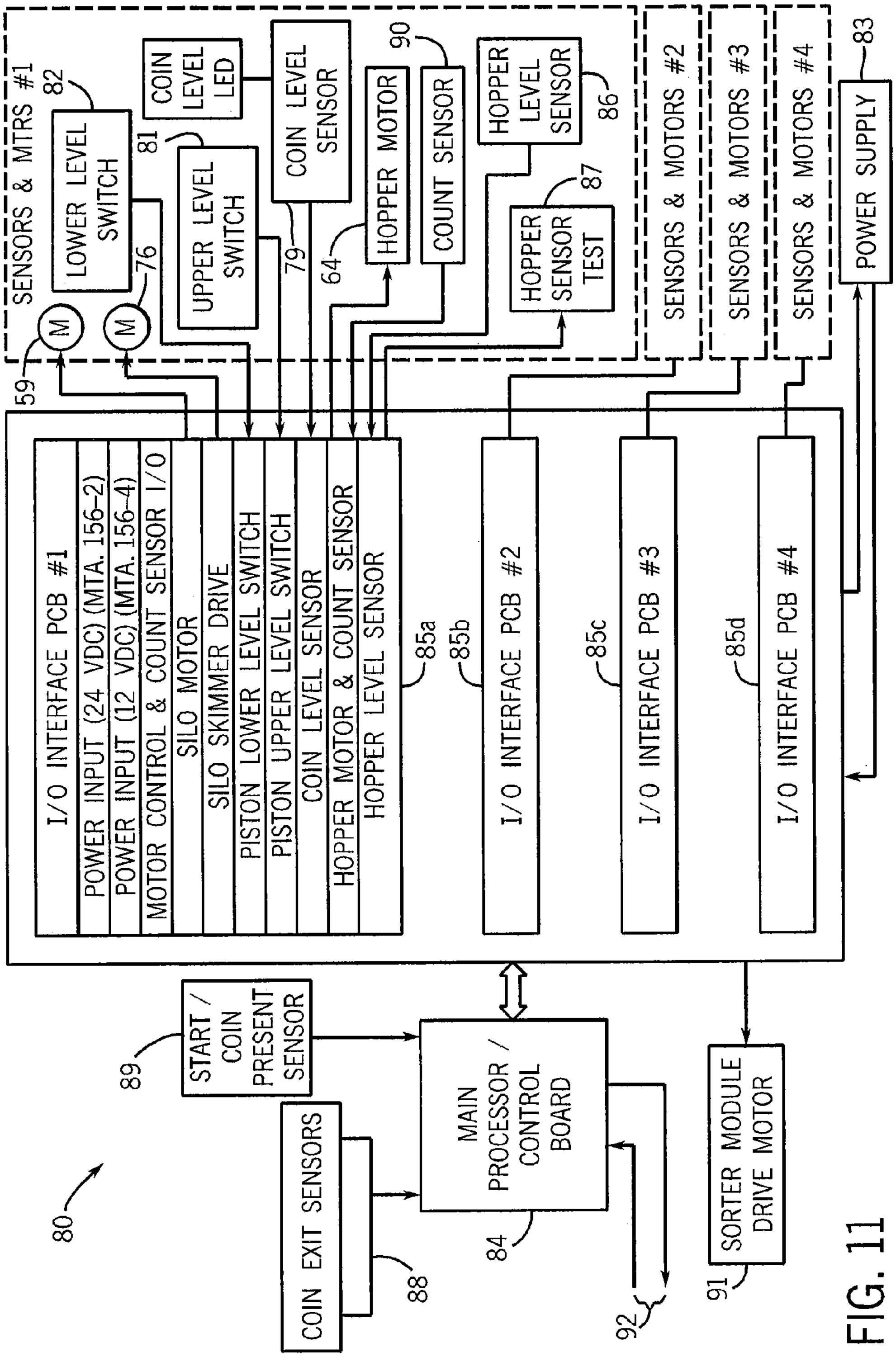
FIG. 11 is block diagram of an electronic controller for the machine of FIGS. 1-10.

The BCS receptacles 31-34 each have a piston 56 (FIGS. 6, 7), the upper surface 57 of which forms a lifting platform for supporting the coins flowing into the receptacles 31-34 from the top. As the coins flow in, the piston 56 is pushed downward against a compression spring 58. The lifting platform 57 can be forced upward when motors 59 near the bottoms of the BCS receptacles 31, 32, 33, 34 are energized. These motors 59 are each coupled through a pulley 60 on their output shaft, a belt 61 and a second pulley 62 to a screw shaft 66. When the screw shaft 66 is rotated, it moves relative to a nut 67 (FIG. 9) disposed in a cavity 68 in the piston 56 which is seen in FIGS. 10 and 11. In FIG. 10, the piston 56 is in its lowermost or retracted position and in FIG. 11 the piston 56 is in its uppermost or fully advanced position.

Figure 8:
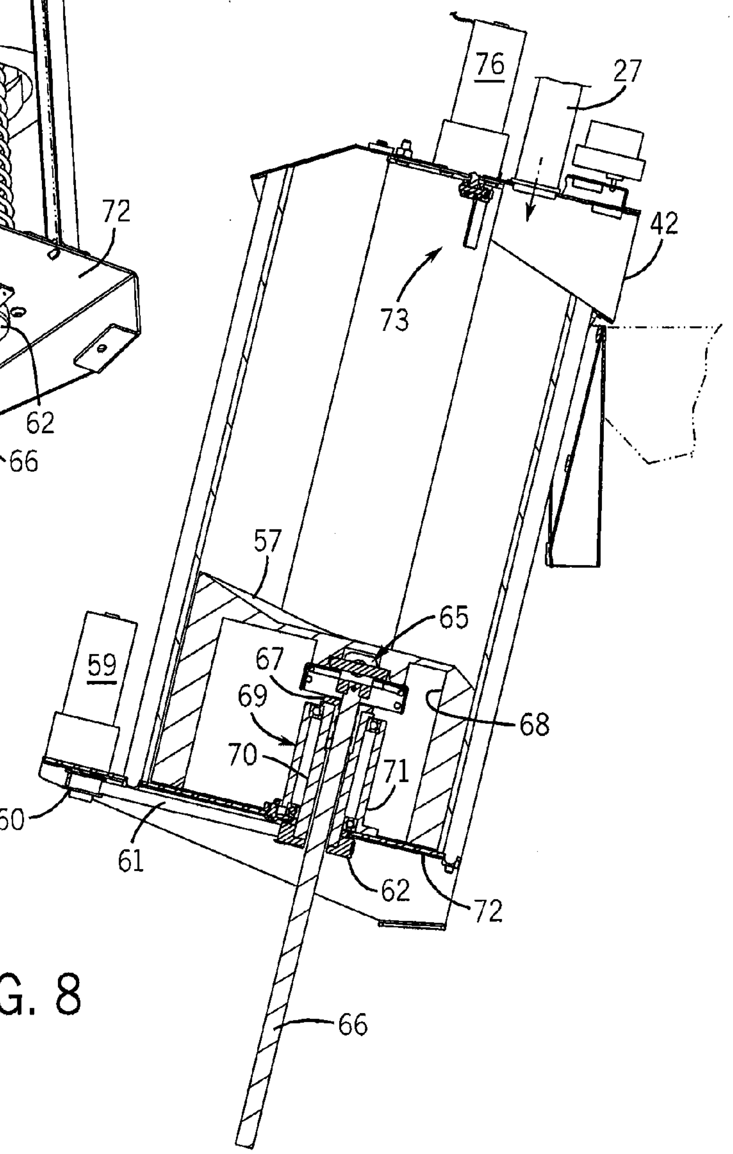
FIG. 8 is a sectional view taken in a plane indicated by line 8-8 in FIG. 7.

Referring to FIG. 8, the screw shaft 66 enters a floor 72 of the BCS receptacle through an opening and extends through a bearing assembly 69 that has an inner sleeve 70 mounted for rotation within an outer sleeve 71. The outer sleeve 71 is fixed to the floor 72 and it locates and retains a lower end of the compression spring 58 as seen in FIGS. 8 and 9. The nut 67 is coupled to the drive pulley 62 through the inner sleeve 71 to allow the nut 67 to rotate with the pulley 62. As the nut 67 is rotated, it causes the linear advance of the shaft 66 and lifting platform 57 as seen in FIG. 9. A gimbaling mechanism 65 is provided where the upper end of the shaft 66 connects to the piston 56 to allow some tilt of the piston in response to unbalanced loading.

The lifting platform 57 is positioned at a level of a top layer of coins in a BCS receptacle 31 and opposite the exit chute 42 seen in FIG. 6. In this position, a skimmer device 73 is rotated to move coins off the top of the pile and into the exit chute 42. The skimmer device 73 is rotatable and has two spaced apart blades or paddles 74 for pushing the coins. The skimmer device 73 in each BCS receptacle is driven by its own individual motor 76 as seen in FIGS. 2-10.

Each BCS receptacle 31, 32, 33, 34 has a limit switch 81 (FIG. 11) near the top of the receptacle to sense the coin level in the receptacle, and it also has a limit switch 82 (FIG. 11) at the bottom of the receptacle to sense the piston 56 at its lowest position.

A controller 80 is located under the sorter 21 (FIGS. 2, 5 and 6) and a schematic of the controller 80 is provided in FIG. 11. The controller 80 includes a power supply 83, a main processor control board 84 and a group of four I/O (input/output) interface boards 85*a*, 85*b*, 85*c* and 85*d*. The main processor control board 84 includes a microelectronic CPU for executing a suitable control program, a memory for non-volatile storage of the control program and a RAM memory for temporary storage of data during operation.

The main processor board 84 is directly connected to sensors 88 (FIG. 11) at the sorting exits of the sorter 21 to sense and count denominations sorted by the sorter 21. The main processor board 84 is also connected to a coin present sensor 89 (FIG. 11), which is utilized to start and stop the coin sorter.

The main processor board 84 is connected through the I/O (input/output) interface boards 85*a*-85*d* (FIG. 11) to other sensors on the machine. The I/O interface boards would each include a logic circuit or I/O control CPU for closing a control loop through certain of the sensors on the I/O interface boards as will be explained further below. Signals and data for other sensor is communicated back and forth the main controller CPU as will be explained below. Sensors such as an upper limit switch 81 and lower limit switch 82 for sensing the limits of travel of the piston 56 would be sensed and controlled by the I/O control logic circuit or CPU. The I/O interface boards 85*a*-85*d* would each be connected to a level sensor 79 disposed approximately at the level where coins are skimmed off into the dispensing receptacles 46-49. The I/O interface boards 85*a*-85*d* would be connected to drive the BCS motor 59 in either rotational direction to raise and lower the piston 56. They would also sense the level of coins in the dispensing hoppers 46-49 through a dispensing hopper coin level sensor 86 in each hopper. The hopper motor 86 for ejecting coins from each of the dispensing hoppers 46-49 would be interfaced through the I/O interface board 85*a*-85*d*, but controlled by the main controller CPU. So, too, the dispensing hopper count sensor 90 for detecting and counting coins as they exit each hopper 46-49 would be connected through the I/O interface board to send count signals or at least count totals back to the main controller CPU. One bit of output data would also be transferred occasionally to test the dispensing hopper count sensor 90, as represented by block 87.

In the present application, only four dispensing hoppers 46, 47, 48, 49 have been shown for pennies, nickels, dimes and quarters, respectively, but for the euro coin set as many as eight dispensing receptacles could be used for denominations of one euro cent through two euros. It is also possible to run deposit or dispense a single denomination of coins with the machine.

The coin recycling machine 10 must be provided with an initial amount of coins before beginning dispensing operations, which would occur at the beginning of the work shift. It would then be available for dispensing operations, as well as coin intake operations in which tills or cash drawers are emptied in the intake hopper. These operations can be carried on simultaneously with cash dispending operations.

The coin exit sensors 88 on the coin sorter 21 allow the main processor board 84 to track the amount of coinage deposited into the machine 10. The count sensors 90 on the dispensing hoppers 46-49 allow the main processor board 84 to track the amount of each denomination that is dispensed. By subtracting the second number from the first number for each denomination, the amount of coins in the machine 10 for each denomination can be determined. In addition, the amounts received and dispensed from individual employees can be tracked and reconciled.

FIG. 10 shows a modification to the BCS receptacles for the present invention. The machine includes the intake hopper 19, the coin sorter 21 and the other parts of the coin recycling machine 10 described previously. Instead of the BCS receptacles 31-34 with lifting platforms 57, this modification provides large gravity feed hoppers 93 for bulk storage of coin. A diverter 94 is used to direct coins either to a bag supply tube 95 or to the gravity feed hopper 93. The hopper 93 has an exit control mechanism 96 to control the dispensing of coins downward into the dispensing hoppers 46-49. The gravity feed hoppers 93 (four for this example) each have a volumetric capacity of approximately ten times that of the dispensing hoppers 46-49, but do not have a capacity as great as the mechanized BCS receptacles 31-34 which utilize the motorized lifting platform 57 to transfer coins to the dispensing hoppers 46, 47, 48, 49.

Figure 12:
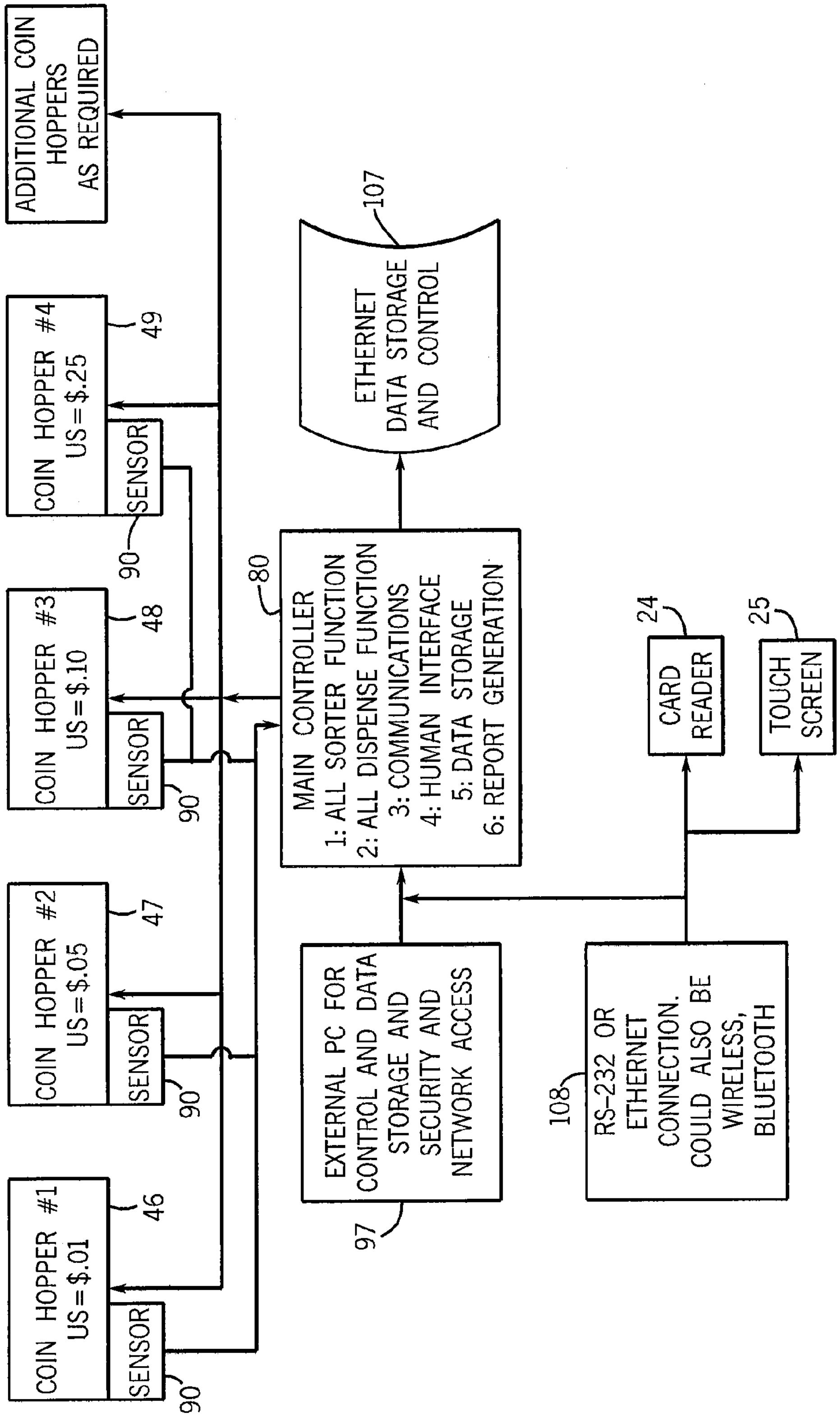
FIG. 12 is a functional block diagram of the machine of FIGS. 1-11.

FIG. 12 shows a functional block diagram of the machine 10 of the present invention with connections to certain peripherals, networks and I/O devices. The dispensing hopper assemblies 46-49 are connected for sensing and control to a controller 80 in the coin recycling machine 10. This controller 80 will control the coin sorter 21, control the dispensing of coins from hopper assemblies 46-49, control network communications for input and output of data through a personal computer 97, the keypad/card reader 24 or the touch screen 25

(human interface). Such a controller 80 would include other circuitry seen in FIGS. 11 and 12, such as network interface circuitry 108 such as Ethernet interface circuitry, RS-232 interface circuitry and/or Bluetooth™ RF interface circuitry for wireless communication. The controller 80 can also be used to maintain database information related to completed transactions, malfunctions and system errors, machine usage, and other data. The controller 80 receives commands from a personal computer 97, the keypad/card reader 24 or the touch screen 25, which determines the function of the machine (e.g., accept coin through the sorter, dispense coin out of the hoppers, get data from control).

Figure 13:
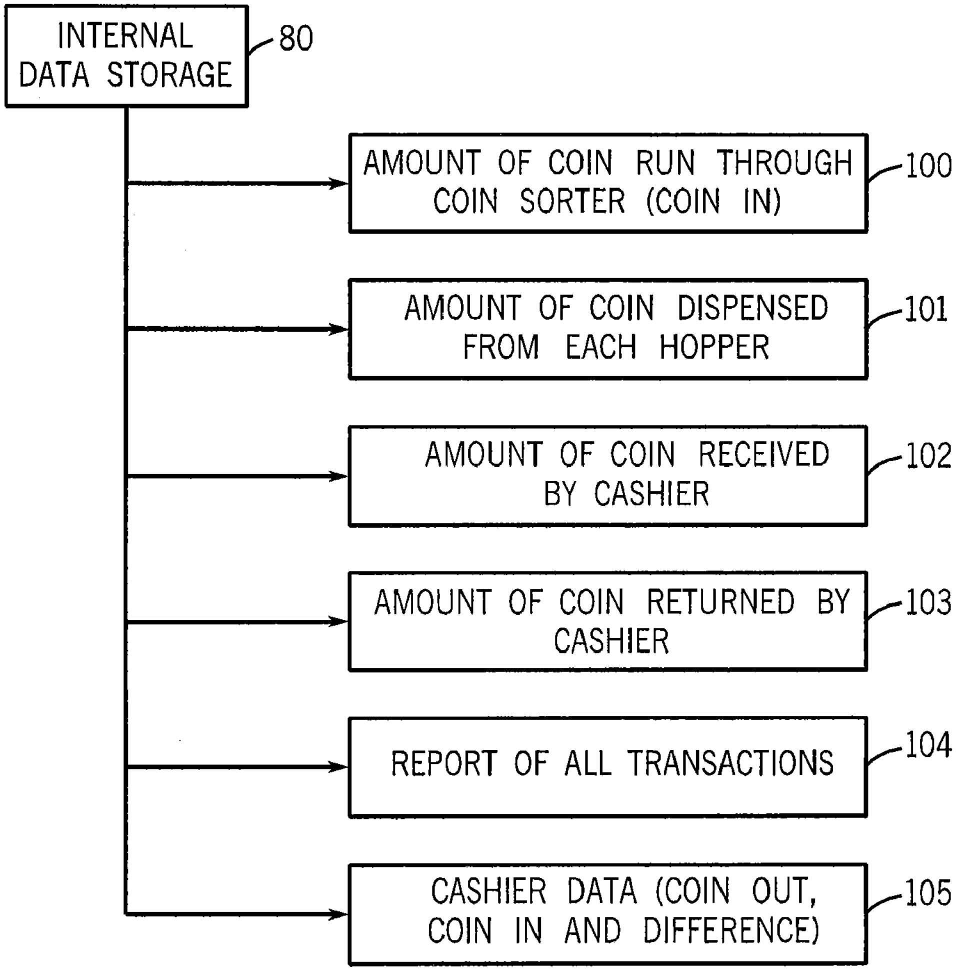
FIG. 13 is a block diagram of the data stored in stored in a memory in the controller of FIG. 12.

FIG. 13 shows the type of data that is stored in the controller 80 and in the personal computer 97 or other computer which communicates with the machine 10 through the network 108 (FIG. 12). In FIG. 11, the first block 100 represents storage for an amount of coinage run through the coin sorter 21 (coin in) and stored in the BCS receptacles 31-34. The second block 101 represents storage for an amount of coin dispensed by each respective hopper assembly 31-34 (coin out). The next block 102 represents storage for an amount of coin received from a particular employee. The next block 103 represents storage for an amount of coinage input by a specific employee. The next block 104 represents a report of all transactions for each employee for each work shift. The last block 105 represents a cash settlement or reconciliation showing the differences between cash dispensed to each employee versus cash input from each employee. The results represented by the last two blocks 104, 105 can be transmitted to a central accounting computer through a suitable network.

Figure 14:
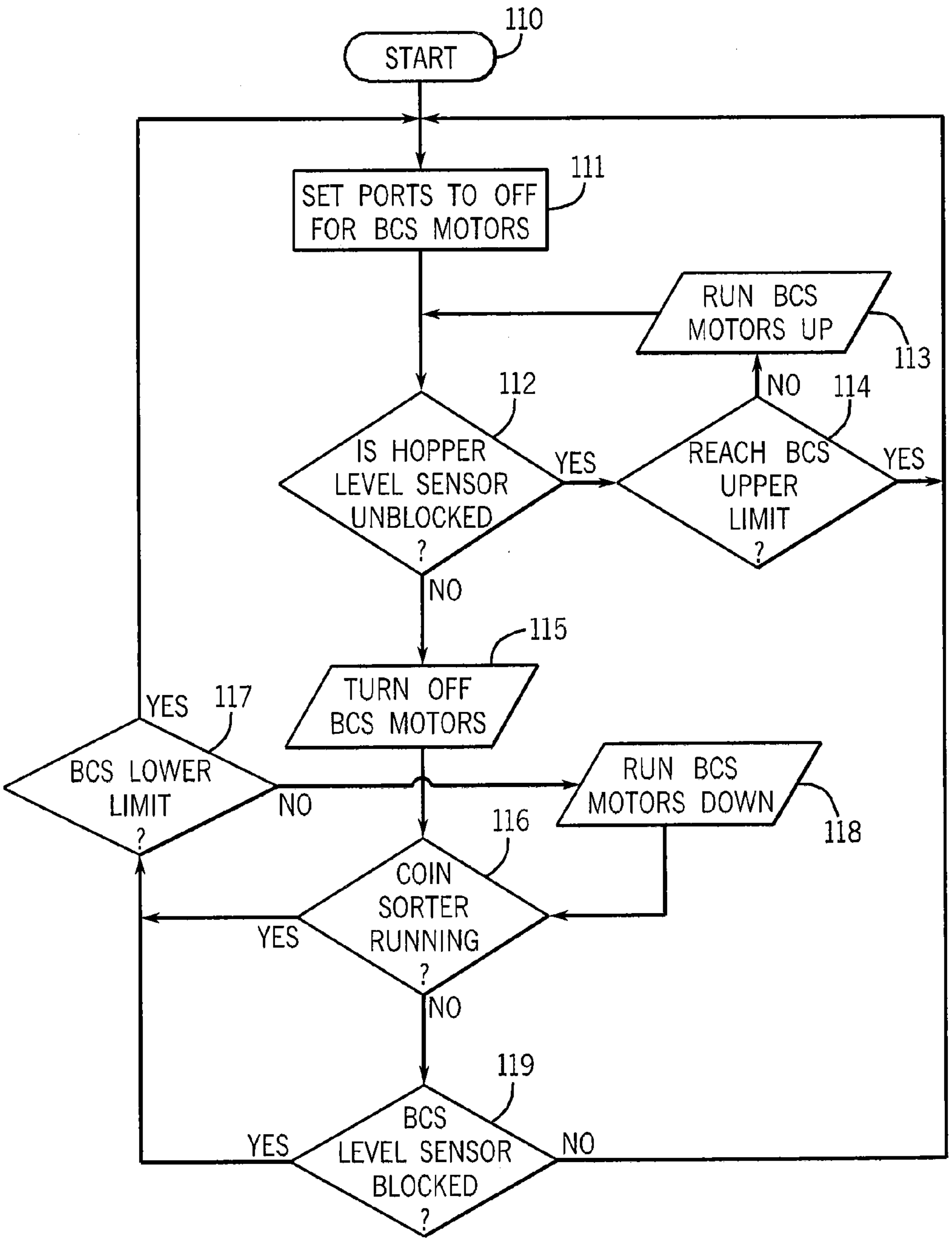
FIG. 14 is a flow chart of a control sequence executed by the I/O interface modules for controlling the refilling of the hoppers from the BCS receptacles.

Referring next to FIG. 14, there is illustrated a flow chart of a control sequence executed by the I/O interface boards 85*a*-85*d* for controlling the refilling of the hoppers 46-49 from the BCS receptacles 31-34. The blocks in the flow chart correspond to groups of one or more program instructions which can be executed by the CPU in the interface boards 85*a*-85*d* or correspond to equivalent logic circuitry, such as a gate array, to carry out the described operations. After the start of the sequence represented by start block 110, some I/O control ports are initialized to be sure that the BCS receptacle motors 59, 76 are off and that the dispensing hopper motors 64 are off, and this is represented by process block 111. Next, as represented by decision block 112, a test is made to see if the hopper level sensor is unblocked, meaning that the dispensing hoppers are less than full. If the result is positive, as represented by the "Yes," branch from decision block 112, then additional coin is supplied for the respective denomination by operating the BCS receptacle motor 59 and the skimmer motor 76 as represented by I/O block 113 until such time as the BCS receptacle 31-34 is empty, which is represented by the lifting platform 57 reaching the upper limit switch as represented by the "Yes" result from the decision block 114. As long as there is coin in the BCS receptacles 31-34, the result from decision block 114 will be "No," and the BCS motors and skimmer motors will keep running until they reach their highest level.

When the dispensing hopper(s) is (are) full, the result from decision block 112 will be "No," and the BCS motor or motors will be turned off as represented by I/O block 115. Next, as represented by decision block 116, a check is made to see if the coin sorter 21 is running for a coin deposit operation. If the answer is "Yes," as represented by the "Yes" branch from decision block 116, meaning that coins are flowing into the BCS receptacle, the operation proceeds to test for the BCS receptacle lower limit, as represented by decision block 117. The processor or logic circuit in the I/O interface board 85*a*-85*d* will then execute instructions or logic signals to test for the lower limit of travel for the platform 57 as represented by decision block 117, and will keep accepting coins until the platform 57 reaches its lower travel limit where the BCS motor is turned off as represented by process block 111.

In the sequence of operations in FIG. 14, the replenishment of the dispensing hoppers 46-49 takes priority over the filling of the BCS receptacles 31-34. It is assumed here that there is an additional start-up sequence to place an initial amount of coins first in the BCS receptacles. On start-up, the machine 10 will require a starting balance of coin to satisfy initial dispensing commands. Bulk coin is fed into the machine hopper 19. It is then sorted into the BCS receptacles 31-34 and an initial amount is transferred to the dispensing hoppers 46-49. The machine controller 80 stores the value of the coinage denominations which have been input into the machine 10.

If the coin sorter 21 is not running, as tested in decision block 116, then a test is made, as represented by decision block 119 to see in the BCS receptacles 31-34 are full as determined by the upper BCS coin level sensors 79. If they are not full, the process loops back to decision block 112, to first check for a need to refill the hoppers in decision block 112. If the BCS level sensor is blocked, as result of the test represented by decision block 119, then a check is made to see if the platform can be moved down to accept more coin as represented by decision block 117. If the answer from executing decision block 117 in FIG. 14 is "Yes," signifying sufficient supply of coins, the sequence loops back to block 111. Otherwise, the BCS motor 59 is operated in a direction to move the platform 57 down to accept more coin as represented by I/O block 118.

Figure 15:
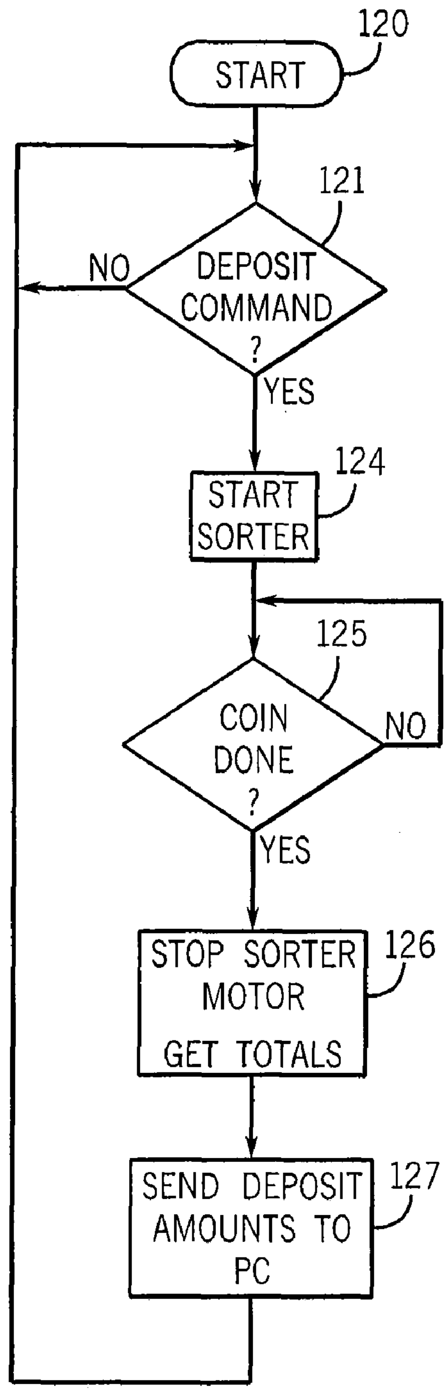
FIG. 15 is a flow chart of a sequence executed by the main processor for a deposit dispensing operation.
Figure 16:
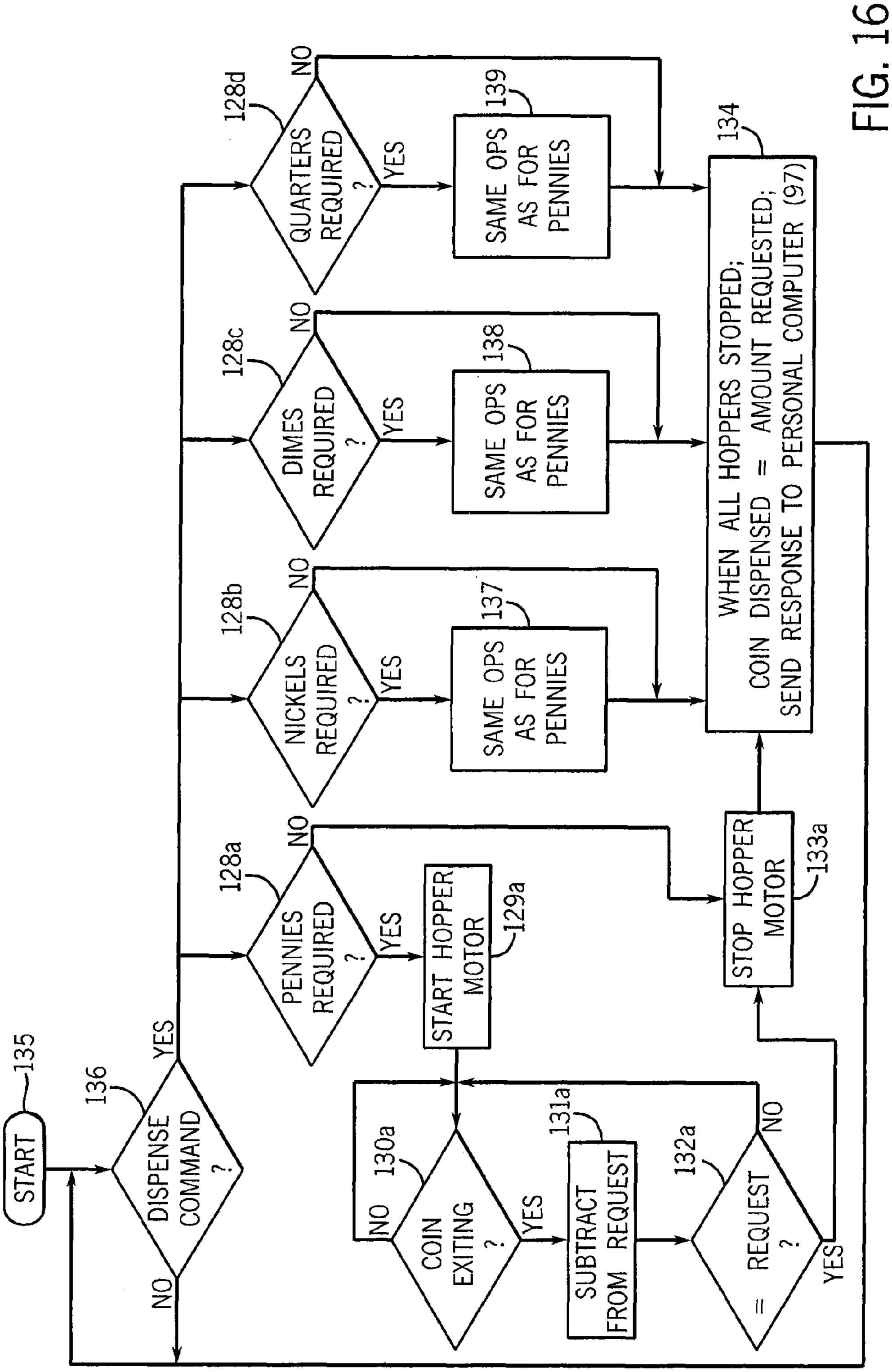
FIG. 16 is a flow chart of a sequence executed by the main process in the controller for a dispensing operation.

When an employee/cashier reports for work, he or she needs to fill his or her cash drawer or till to start the day. The dispensing and deposit operations are controlled as illustrated in FIGS. 15 and 16. Commands, such as "deposit" and "dispense" come from a personal computer 97 as shown in FIG. 12 to the main controller 80. The machine controller 80 is waiting in a loop for a command from the personal computer as represented by decision blocks 121 and 136 in FIGS. 15 and 16. The controller 80 is able to execute the commands in overlapping fashion using a multi-tasking type of operation.

If a dispense command, represented by the "Yes" result from decision block 136 in FIG. 16 is received from a personal computer 97 or from the keypad/card reader 24 or touch screen 25, then coin is dispensed into compartments 16 in the cash drawer or till 15. From the cashier's sign-on through the personal computer 97, or the keypad/card reader 24 or touch screen 25, a known amount of coin will be assigned to the employee. Tests are made by the controller 80 to see if the amount to be dispensed includes pennies, dimes, nickels or quarters as represented by decision blocks 128*a*-128*d*. These checks would be made relatively simultaneously, and the subsequent operations (elements 137, 138 and 139) would be carried on approximately simultaneously. Those operations 137, 138 and 139 would be the same as blocks 129*a*-133*a* for pennies. In that operation, the hopper motor is started as represented by process block 129*a*, the coins are detected as they exit the hopper and are subtracted from the total requested as shown by blocks 130*a* and 131*a* until the requested total is reached as shown by decision block 132*a*. The hopper motor is then stopped as shown by process block 133*a*. When all of the hoppers have completed operation, the amounts dispensed are available to be sent to the personal computer 97 from the controller 80, as represented by process block 134.

If, during the work shift, an employee needs more coinage, the cashier can sign on the machine 10 and request more coinage of all or of individual denominations. The coinage is then charged to the employee's account.

At the end of the employee's shift, the employee will sign on through the personal computer 97, the keypad/card reader 24 or touch screen 25 and initiates a "BALANCE" or "RECONCILE" operation. Referring to FIG. 15, when the employee returns cash during a work shift, the cash is deposited in the intake hopper 19, the employee inputs an ID or account number with the personal computer 97, keypad/card reader 24 or touch screen 25, and the machine 10 is started to sort the coins and store them in the bulk coin storage receptacles 31-34 as represented by process block 124. Otherwise, the machine is in a wait loop back to the start block 120 as represented by the "No" result from decision block 121. The sorter 21 then sorts the coins and stores coins of respective denominations in the respective BCS receptacles 31-34. The amount deposited is counted by sensors 88 on the coin sorter 21 as the coins are sorted. A test is executed as represented by decision block 125 to see when all the coins have been sorted, and when the result is yes, the sorter motor is stopped. The amount totals are accumulated and will be added to the amounts already stored in the bulk coin storage receptacles 31-34. The deposited amounts are stored in the controller memory along with the user account number. All of this information can also be sent as data to a local computer 97 or to a central accounting computer via the network 92 as represented by process block 127.

The coin recycling machine 10 can also be connected to a note recycler and can send dispense commands to dispense notes and receive data representing amounts of notes deposited in the note recycler. This allows the tracking of both coins and notes for various employees. The controller 80 of the present invention can also be provided in a note recycler for tracking notes dispensed to an employee and notes received from an employee, using a card reader and note denomination receptacles as described for the coin recycling machine. It will be apparent to those of ordinary skill in the art that other modifications might be made to these embodiments without departing from the spirit and scope of the invention, which are defined by the following claims.

We claim:

1. A coin recycling machine for receiving coins, for sorting coins into a plurality of denominations and for automatically dispensing coins as a plurality of sorted denominations to an individual receptacle associated with a respective user and having compartments for receiving and holding respective denominations, the machine comprising:

a housing;

an intake area on the housing configured for receiving batches of unsorted coins which are dumped into the machine by the user from the individual receptacle having compartments for holding respective denominations;

a sorting mechanism for receiving the batches of coins loaded into the machine and sorting the coins into a plurality of denominations;

a plurality of dispensing hoppers for holding the coins by denomination in unstacked piles by denomination, the dispensing hoppers having respective exits positioned for dispensing to an individual receptacle having compartments for receiving and holding respective denominations;

a plurality of bulk coin storage receptacles positioned for receiving the coins from the sorting mechanism and holding the coins in unstacked piles by denomination for transfer to the dispensing hoppers;

coin transfer mechanisms for transferring coins from the bulk coin storage receptacle to the dispensing hoppers;

an input device for transferring inputs from a user to associate the user with a batch of coins being loaded into the machine from the individual receptacle and to associate the user with coins being dispensed to the user in an individual receptacle having compartments for holding respective denominations; and a controller electronically connected to the input device and to the sorting mechanism for calculating first totals for amounts of coins received through the intake area and associated with the user, the controller also being electrically connected to the dispensing hoppers for automatically dispensing coins to the individual receptacle associated with the user and having compartments for receiving and holding respective denominations and accumulating second totals for coins being dispensed, and for making available the first and second totals associated with the user for comparison; and wherein the controller associates inputs from a plurality of users with cash balances of coins dispensed and received for respective users during their respective work shifts.

2. The coin recycling machine of claim 1, wherein the controller also controls the coin transfer mechanisms for transferring coins from the bulk coin storage receptacle to the dispensing hoppers.

3. The coin recycling machine of claim 2, wherein the controller has a plurality of control circuits one for each denomination, which control transfer of coins from a respective one of the bulk coin storage receptacle to a respective one of the dispensing hoppers.

4. The coin recycling machine of claim 1, wherein each of the bulk coin storage receptacles has a capacity at least three times the capacity of one of the dispensing hoppers.

5. The coin recycling machine of claim 4, and further, wherein each of the bulk coin storage receptacles has a capacity at least ten times the capacity of one of the dispensing hoppers.

6. The coin recycling machine of claim 1, wherein said controller is able to total the coins being loaded into the machine in an input operation as well as counting of coins being dispensed in an output operation during a time interval in which the input operation is also being conducted.

7. The coin recycling machine of claim 1, further comprising diverters positioned near exits from the bulk coin storage receptacles for directing coins either to the dispensing hoppers or to coin bags.

8. The coin recycling machine of claim 1, wherein the bulk coin storage receptacles have lifting platforms for lifting coins from the receptacles to a predefined height for contact by the skimmer mechanisms.

9. The coin recycling machine of claim 1, wherein the coin transfer mechanisms further comprise skimmer mechanisms mounted on the bulk coin storage receptacles for pushing coins on top of the unstacked piles from bulk coin storage receptacles to the dispensing hoppers.

10. The coin recycling machine of claim 1, wherein the bulk coin storage receptacles operate by gravity, and wherein the coin transfer mechanisms further comprise mechanisms which allow coins to gravity feed downward from the bulk coin storage receptacles to the dispensing hoppers.

11. The coin recycling machine of claim 1, the housing has a cash drawer receiving slot in a front side of the housing that is configured to receive a cash drawer having multiple compartments; and wherein the coins are dispensed into the multiple compartments of the cash drawer by denomination.

12. The coin recycling machine of claim 1, wherein the controller includes memory for storing a plurality of user accounts with a balance per user of coins received and coins dispensed during a work shift.

13. The coin recycling machine of claim 1, wherein:

the input device is a card reader input device electrically connected to the controller for transferring inputs from a plurality of users to the controller.

14. The coin recycling machine of claim 1, wherein:

the input device is a touch screen input device electrically connected to the controller for transferring inputs from a plurality of users to the controller.

15. The coin recycling machine of claim 1, wherein:

the input device is a personal computer electrically connected to the controller for transferring inputs from a plurality of users to the controller.

16. The coin recycling machine of claim 1, further comprising a coin level sensor in each dispensing hopper and wherein the controller responds to a signal from the coin level sensor to actuate the coin transfer mechanisms to transfer coins from bulk coin storage receptacles to the dispensing hoppers.

17. The coin recycling machine of claim 1, wherein the controller is responsive to denomination sensors associated with the dispensing hoppers and is responsive to inputs from a user in a first operating cycle of the machine to cause the receptacles to dispense an amount of coins sorted by denomination and to store the dispensed amount of coins in memory in association with a user account number, the controller being responsive to input of a batch of coins and the user account number in a second cycle to count the coins received, and store the amount of coins received and the amount of coins dispensed for comparison to determine a net amount of cash associated with the user.

18. The coin recycling machine of claim 11, wherein:

the controller includes a memory for storing a plurality of user accounts with a balance per user of coins received and coins dispensed during a work shift; and the coin recycling machine further comprising a card reader input device electrically connected to the controller for transferring inputs from a plurality of users to the controller.

* * * * *

UNITED STATES PATENT AND TRADEMARK OFFICE

CERTIFICATE OF CORRECTION

PATENT NO. : 7,992,699 B2
APPLICATION NO. : 10/821004
DATED : August 9, 2011
INVENTOR(S) : Thomas P. Adams et al.

It is certified that error appears in the above-identified patent and that said Letters Patent is hereby corrected as shown below:

In Column 10, lines 48 - 56, claims 8 and 9 should be renumbered and read as follows:

-- 8. The coin recycling machine of claim 1, wherein the coin transfer mechanisms further comprise skimmer mechanisms mounted on the bulk coin storage receptacles for pushing coins on top of the unstacked piles from bulk coin storage receptacles to the dispensing hoppers.

9. The coin recycling machine of claim 8, wherein the bulk coin storage receptacles have lifting platforms for lifting coins from the receptacles to a predefined height for contact by the skimmer mechanisms. --

Signed and Sealed this
Twenty-ninth Day of May, 2012

David J. Kappos

David J. Kappos
*Director of the United States Patent and Trademark Office*